US008296935B2

(12) United States Patent
Montena

(10) Patent No.: US 8,296,935 B2
(45) Date of Patent: Oct. 30, 2012

(54) COMPRESSION TOOL WITH RETAINING MEANS FOR COAXIAL CABLE CONNECTION

(75) Inventor: Noah P. Montena, Syracuse, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 820 days.

(21) Appl. No.: 12/476,289

(22) Filed: Jun. 2, 2009

(65) Prior Publication Data

US 2009/0260227 A1 Oct. 22, 2009

Related U.S. Application Data

(63) Continuation of application No. 11/552,748, filed on Oct. 25, 2006, now Pat. No. 7,562,442.

(51) Int. Cl.
*B23P 19/00* (2006.01)

(52) U.S. Cl. ................ 29/751; 29/753; 29/760; 29/863; 72/409.14

(58) Field of Classification Search .................... 29/751, 29/753, 760, 863; 72/409.14
See application file for complete search history.

(56) References Cited

U.S. PATENT DOCUMENTS 2,369,180 A 2/1945 Rosenthal
3,980,805 A 9/1976 Lipari
4,307,504 A 12/1981 Davis et al.
4,349,944 A 9/1982 Fickes
4,558,584 A 12/1985 Myers
4,729,531 A 3/1988 Smith et al.
5,305,510 A 4/1994 Croft et al.
5,647,119 A * 7/1997 Bourbeau et al. ............... 29/751
5,934,137 A 8/1999 Tarpill
5,941,120 A 8/1999 Jee
6,272,738 B1 8/2001 Holliday et al.
6,293,004 B1 9/2001 Holliday
6,591,487 B2 * 7/2003 Chang ............................. 29/751
6,708,396 B2 3/2004 Holliday
6,820,326 B1 11/2004 Tarpill et al.
6,948,234 B1 9/2005 Steiner
7,028,393 B2 4/2006 Wei
7,096,573 B2 8/2006 Holliday
7,120,997 B2 10/2006 Islam et al.
7,188,507 B2 * 3/2007 Holliday et al. ........... 72/409.14
7,210,327 B1 5/2007 Tarpill et
7,299,542 B2 11/2007 Montena
7,346,980 B2 3/2008 Liao
7,562,442 B2 * 7/2009 Montena ......................... 29/751
7,627,944 B2 * 12/2009 Holliday ......................... 29/751

* cited by examiner

*Primary Examiner* — Carl Arbes
(74) *Attorney, Agent, or Firm* — Schmeiser, Olsen & Watts, LLP

(57) ABSTRACT

Provided is a coaxial cable connector compression tool comprising a resilient coaxial cable retaining mechanism, having a tool mounting portion, affixed to said compression tool and a compliant cable receiving portion configured to releasably retain a coaxial cable, wherein the cable retaining mechanism, which may be comprised or one or multiple pieces, bears minimal compression forces while positioned on said compression tool to hold said coaxial cable in proper alignment when said compression tool is operated. Moreover, a method is provided for retaining a coaxial cable in proper alignment during compression of a coaxial cable connector onto said coaxial cable.

10 Claims, 11 Drawing Sheets

COMPRESSION TOOL WITH RETAINING MEANS FOR COAXIAL CABLE CONNECTION

This application is a continuation application claiming priority from Ser. No. 11/552,748 filed on Oct. 25, 2006.

FIELD OF THE INVENTION

The present invention pertains generally to the field of coaxial cable connector tools. More particularly the present invention pertains to compression tools having a mounted coaxial cable retaining device and corresponding methods of use.

BACKGROUND

Communication cables and in particular coaxial cables used for the transmission of information are commonplace and used in a multitude of environments. The electronics, telecommunications, and cable television industries utilize a variety of cables and wires to perform various jobs. Each cable or wire may have variously sized connectors based upon either an industry standard or in some cases a proprietary manufacturing standard. The industry has used compression tools to attach various sizes and types of connectors onto cables. Ordinary compression tools include a force bearing connector seat having cable retaining features and/or connector retaining features to help properly align the cable and/or connector during tool compression. Accordingly, disadvantages of common compression tools arise because the standard tools must include retaining mechanisms which are sturdy enough to bear high compression forces and precise enough to ensure proper cable and/or connector alignment during each tool compression cycle; and yet the retaining devices must be easily movable so as not to make insertion and removal of the cable and/or connector difficult. Thus, ordinary compression tool cable/connector retaining apparatus tend to be robust having complex designs with multiple parts and costly manufacture and assembly requirements. The instant invention addresses the abovementioned drawbacks pertinent to typical compression tools having common coaxial cable and/or coaxial cable connector retaining devices.

SUMMARY OF THE INVENTION

A first aspect of the present invention provides a coaxial cable connector compression tool comprising: a connector seat, wherein said connector seat bears compression forces related to the compression of a coaxial cable connector onto a coaxial cable by said compression tool; and a resilient retaining mechanism, wherein said retaining mechanism includes a cable retaining member; and further wherein said retaining mechanism is attached to said compression tool in a manner so as to prevent transfer of substantial compression force to said retaining mechanism.

A second aspect of the present invention provides a compression tool mounted coaxial cable retaining apparatus comprising: a compliant structure, said structure being separate from a compression force-bearing cradle portion of a compression tool, wherein said structure includes: a tool mounting portion, affixed to said compression tool; and a flexible cable receiving portion, configured to releasably retain said coaxial cable; and, wherein said compliant structure bears minimal compression forces while positioned on said compression tool to hold said coaxial cable in proper alignment when said compression tool is operated to compress a coaxial cable connector onto said cable.

A third aspect of the present invention provides a compression tool comprising: a connector seat, wherein said connector seat bears compression forces related to the compression of a coaxial cable connector onto a coaxial cable by said compression tool; and means for retaining said coaxial cable in proper alignment during compression of said coaxial cable connector onto said coaxial cable, wherein said means are configured to bear minimal compression forces during tool compression.

A fourth aspect of the present invention provides a method of compressing a coaxial cable connector onto a coaxial cable, said method comprising: providing a compression tool, said compression tool including a retaining mechanism, said retaining mechanism having a tool mounting portion, affixed to said compression tool, and a compliant cable receiving portion, configured to releasably retain said coaxial cable; inserting said coaxial cable into said compliant cable receiving portion; inserting said coaxial cable connector into a connector seat of said compression tool; compressing said compression tool to compress said coaxial cable connector onto said coaxial cable; wherein said retaining mechanism holds said cable in proper alignment without bearing substantial compression forces when said compression tool is operated to compress said coaxial cable connector onto said cable.

BRIEF DESCRIPTION OF THE DRAWINGS

Some embodiments of this invention will be described in detail, with reference to the following figures, wherein like designations denote like members, wherein.

DETAILED DESCRIPTION OF THE INVENTION

Figure 1:
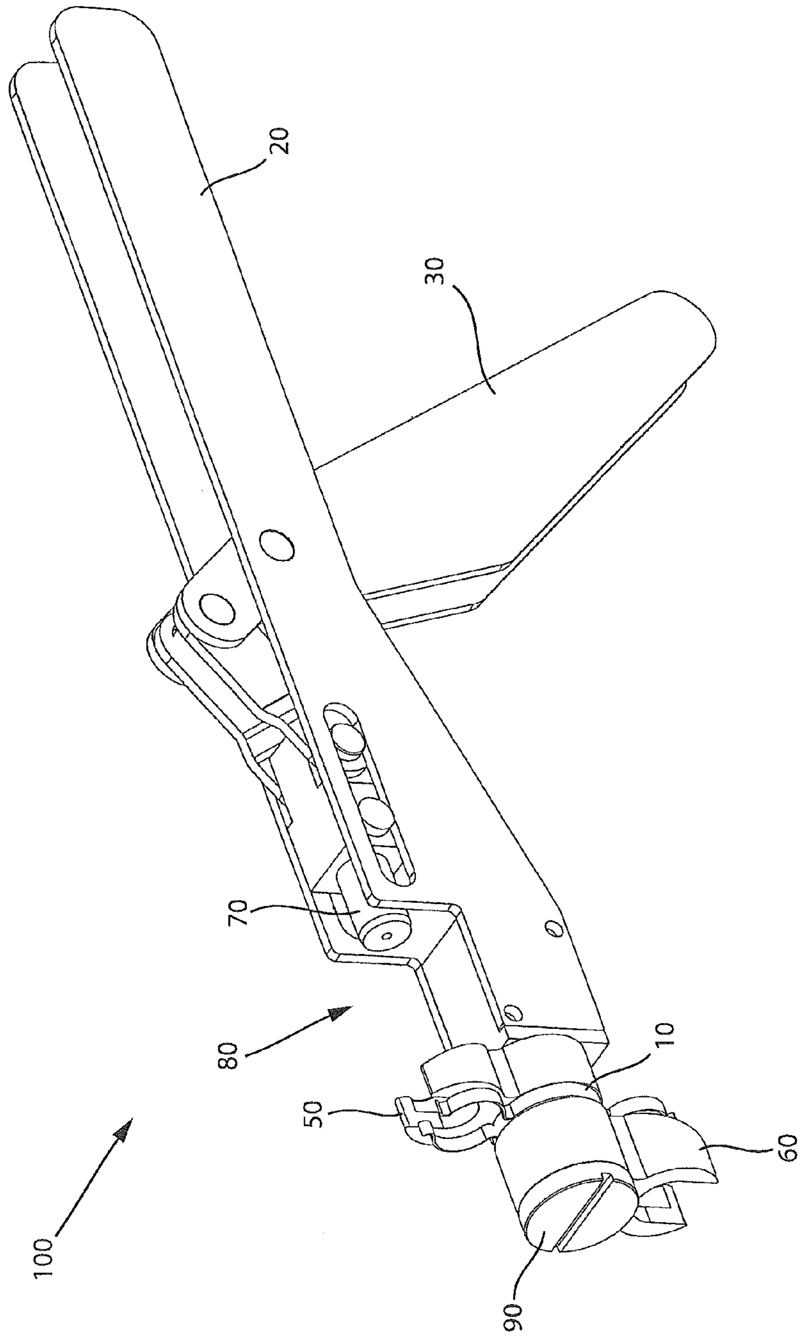
FIG. 1 depicts a front perspective view of an embodiment of a coaxial cable compression tool, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms “a”, “an” and “the” include plural referents, unless the context clearly dictates otherwise.

Referring to the drawings, FIG. 1 depicts a front perspective view of an embodiment of a coaxial cable compression tool 100, in accordance with the present invention. The coaxial cable connector compression tool 100 may be generally in the form of a hand-held tool having a central body handle 20 and an actuator handle 30. In use an operator may grasp the two handles 20 and 30 and squeeze them together to maneuver a drive pin 70 in a direction towards and/or into a connector chamber portion 80 of the tool. Moreover, the coaxial cable compression tool may include a first connector cradle portion 50 and a second connector cradle portion 60. Furthermore, a coaxial cable connector compression tool 100 may include a retaining mechanism 10, being a device configured to releasably retain a coaxial cable (shown and discussed in greater detail in relation to FIG. 5) in proper alignment during operation of the coaxial cable connector compression tool 100. Still further, embodiments of a coaxial cable connector compression tool 100 may also include a connector cradle switch member 90.

Figure 2:
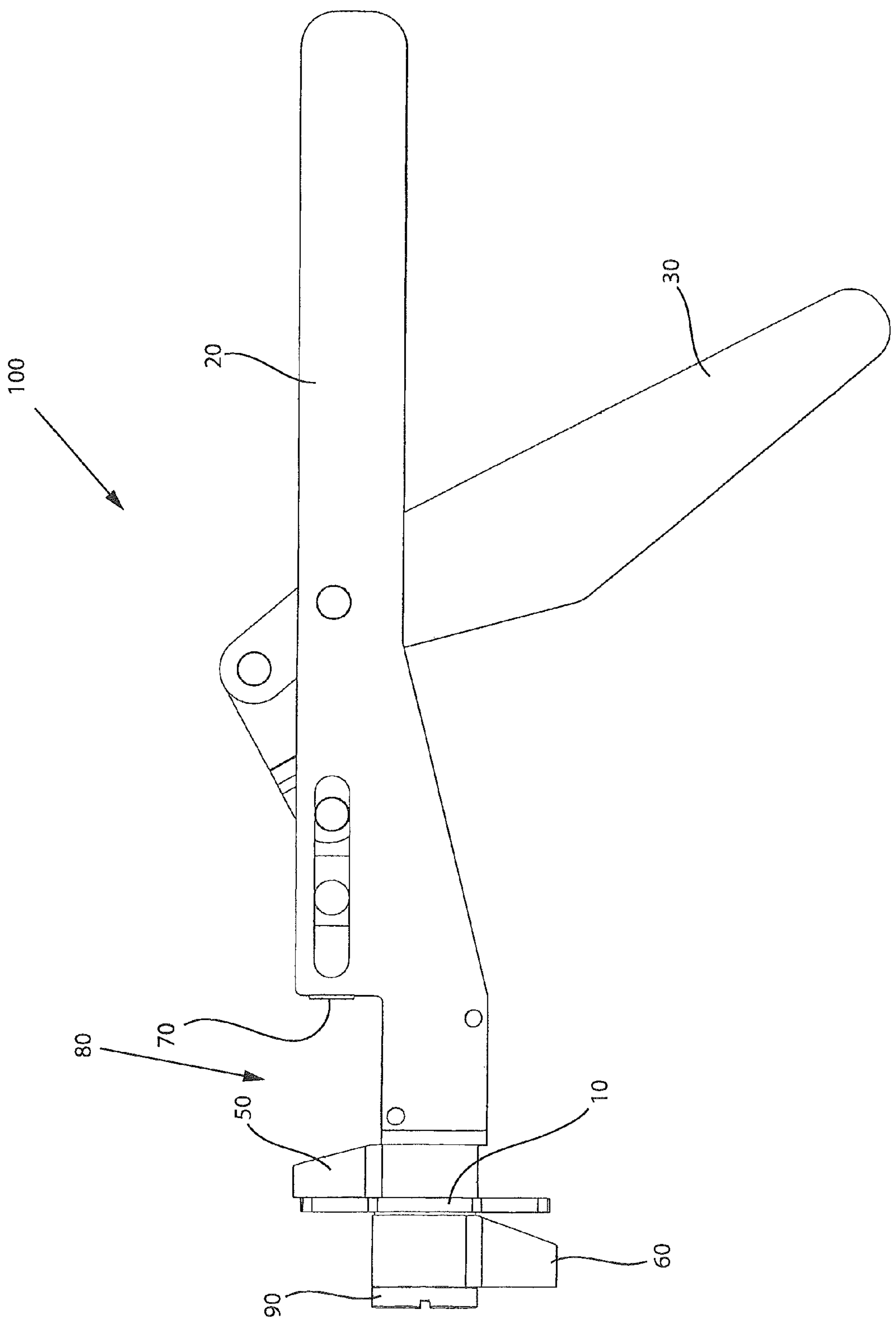
FIG. 2 depicts a side view of an embodiment of a coaxial cable compression tool, in accordance with the present invention.

With continued reference to the drawings, FIG. 2 depicts a side view of an embodiment of a coaxial cable compression tool 100, in accordance with the present invention. As depicted, the tool 100 may include a retaining apparatus 10. The retaining apparatus 10 may be a mechanism mounted between the first connector cradle portion 50 and second connector cradle portion 60. The first connector cradle portion 50 and the second connector cradle portion 60 may be configured to be rotatable, or maneuverable in some other way, allowing the either the cradle portion 50 or cradle portion 60 to be positioned proximate the chamber portion 80 so that connectors of various sizes may be compressed as acted upon by the drive pin 70. The switch member 90 may be actuated to maneuver the one or both of the cable cradle portions 50 and 60. The retaining apparatus 10 may move in conjunction with one or the other of the cable cradle portions 50 and/or 60, or may be a separately movable device operable to be positioned on the compression tool 100 to hold a coaxial cable in proper alignment when the compression tool 100 is operated to compress a coaxial cable connector onto the coaxial cable. The positioning of the retaining apparatus 10 should be such that transfer of substantial compression force to the retaining apparatus 10 is prevented. For example, the retaining apparatus 10 may hold a cable and/or connector in correct position for compression, but should not serve to bear the load of compression when a connector is compressed onto a coaxial cable in the chamber portion 80 of the compression tool 100. Rather, positioning and operation of the retaining apparatus 10 may be provided so that any transfer of compression forces during tool 100 compression is minimized with respect to the retaining apparatus 10. For instance, when an operator squeezes together the central body handle 20 and actuator handle 40 to move the drive pin 70 and compress a connector, no substantial amount of force generated by the operator should be translated to the retaining apparatus 10.

Figure 3:
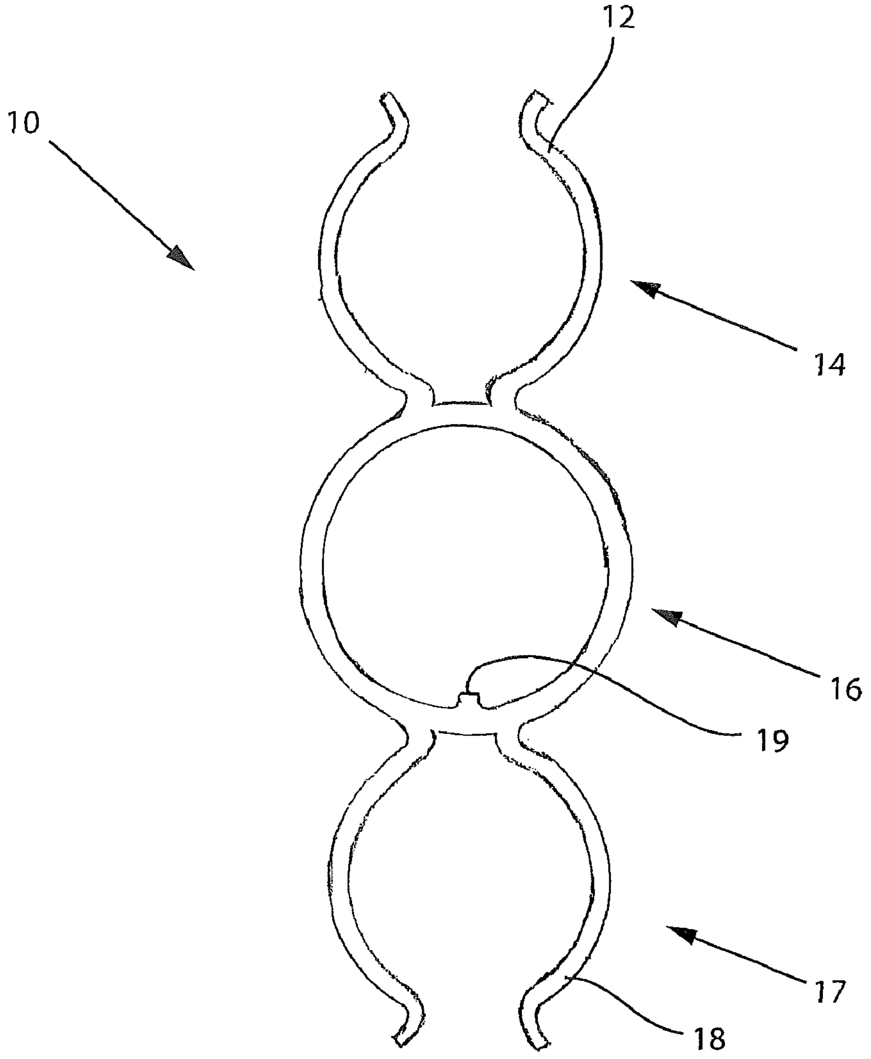
FIG. 3 depicts a front view of an embodiment of a retaining mechanism of an embodiment of a coaxial cable compression tool, in accordance with the present invention.

Referring further to the drawings, FIG. 3 depicts a front view of an embodiment of a retaining mechanism 10 of an embodiment of a coaxial cable compression tool 100, in accordance with the present invention. The retaining mechanism 10 may be configured as a single, unbroken, piece of resilient material. For example the retaining device 10 may generally be fashioned in the form of contiguous rings positioned in a row, wherein at least one of the rings does not form a full circular enclosure. A three-ring type embodiment is depicted in FIG. 3, wherein the top ring may be open having two generally semi-circular cable retaining members 12 or arms extending up from the middle ring or tool mounting portion 16. The top open ring may comprise a flexible and compliant cable receiving portion 14, configured to releasably retain a coaxial cable. For instance, the arms, or cable retaining members 12, may be bent outward to allow releasable insertion of a coaxial cable therein. The tool mounting portion 16 may be attached to an embodiment of a compression tool 100 in a manner so as to prevent transfer of substantial compression force to the retaining mechanism 10. Furthermore, the entire compliant structure forming the retaining mechanism 10 may be configured to bear minimal compression force while operably positioned on the compression tool 100. In addition, the retaining mechanism 10 may include a key member 19 that may operate to affix the mechanism 10 to a compression tool 100. Accordingly the retaining mechanism 10 may be securely vertically oriented in relation to the tool 100. However, it should be appreciated by those of ordinary skill, that embodiments of the retaining mechanism 10 may not include a key member 19 and may be rotatably mounted on a compression tool such that the retaining mechanism may comprise a rotatable element of the tool 100. Embodiments of a retaining device 10 of a compression tool 100 may hold a coaxial cable in proper alignment when the compression tool is operated to compress a coaxial cable connector onto the coaxial cable. Moreover, embodiments of a retaining mechanism 10 may also include a connector receiving portion 17 configured to releasably retain a coaxial cable connector. Accordingly the connector receiving portion 17 may include arms or connector retaining members 17 extending downward (as exemplified in the drawing) from the central tool mounting portion 16. It should be recognized that a retaining apparatus 10 including a connector receiving portion 17 may be oriented on an embodiment of a compression tool 100 such that the connector receiving portion 17 extends upward above the tool mounting portion 17 so as to hold a connector in proper alignment during tool compression. However, like the cable receiving portion 14, the connector receiving portion should also be configured to bear minimal compression forces when a connector held thereby is compressed by the tool 100. Accordingly, an open ring section may comprise the connector receiving portion and may be a one-piece segment configured to releasably retain a coaxial cable. For instance, arms, or connector retaining members 18, may be bent outward to allow releasable insertion of a coaxial cable connector therein. However, the ring may be formed of multiple segments of pieces joined together.

Figure 4:
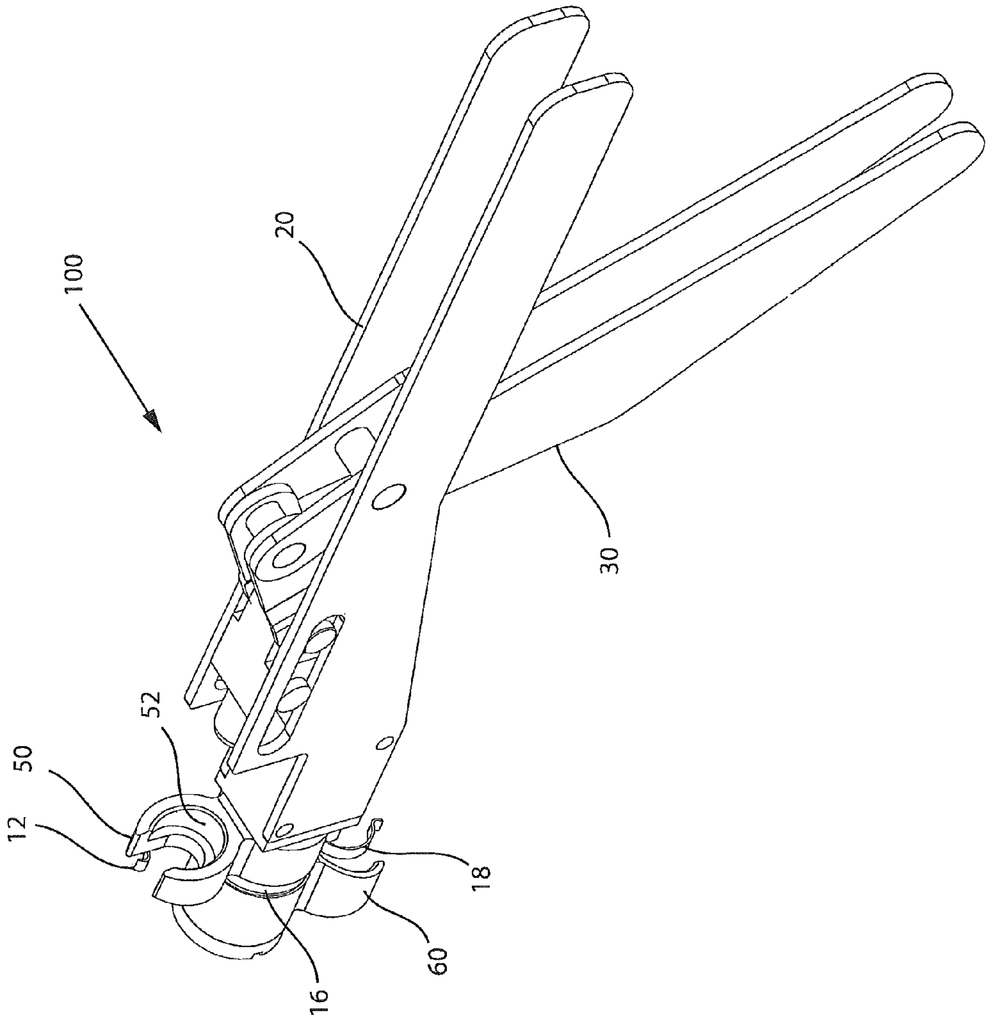
FIG. 4 depicts a rear perspective view of an embodiment of a coaxial cable compression tool, in accordance with the present invention.

With still further reference to the drawings, FIG. 4 depicts a rear perspective view of an embodiment of a coaxial cable compression tool 100, in accordance with the present invention. Various component elements of the coaxial cable compression tool 100 may be formed of various materials. For example, a main body portion of the tool 100 including the central body handle 20 may be comprised of rigid materials such metal, metal alloys, or rigid polymers. Moreover, the actuator handle 30 may also be comprised of rigid materials of similar type. In addition, the connector cradle portions 50 and 60 may be comprised of materials capable of bearing compression loads. That is, the cradle portions 50 and 60 will not yield when a connector is compressed by the tool 100. Accordingly, the connector seat 52 of cradle portion 50 should also likewise be formed of sturdy materials capable of bearing compression loads. As depicted, the connector seat 52 may be configured so that a connector may be seated within the seat 52 to facilitate compression of the connector onto a cable when the tool 100 is compressed.

However, a cable retaining member 12 or a connector retaining member 18 of a retaining apparatus 10 of the tool 100 should be formed of resilient material allowing the retaining members 12 or 18 to bend and flex and thereby operate to releasably retain a respective cable or connector. The mounting portion 16 of a retaining mechanism 10 may be comprised of similar compliant material as that of a retaining member 12 or 18, or the mounting portion may be comprised of a different material. Those in the art should appreciate that the geometry of the retaining portion 16 may serve to provide rigidity to a material with some flexibility. For example, where an embodiment of a retaining apparatus is fashioned out of metal, a complete ring-like shape of the retaining portion 16 may provide some rigidity to the portion, while the open nature of the retaining members 12 and or 18 may allow the members to independently flex.

Figure 5:
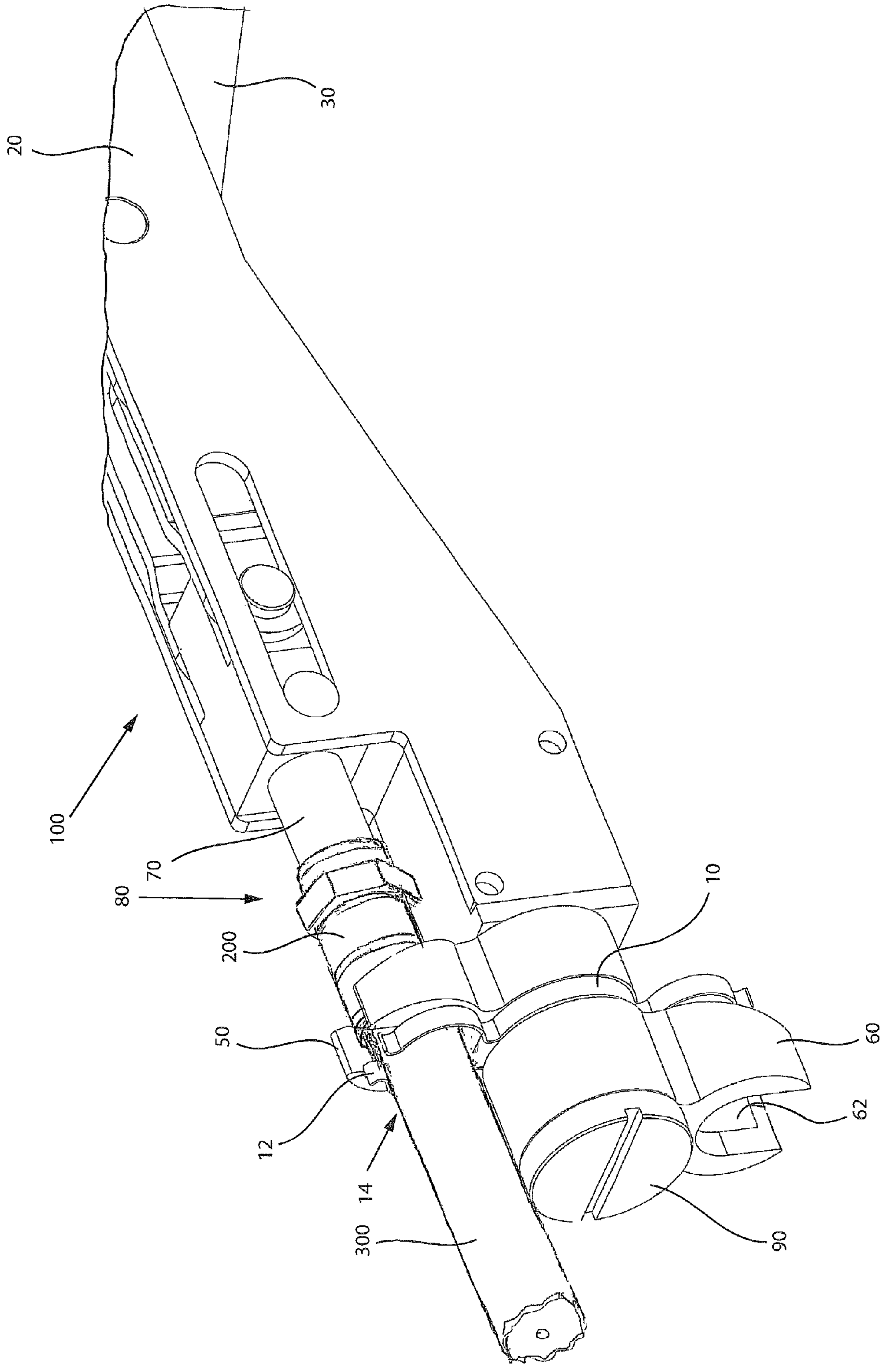
FIG. 5 depicts a partial front perspective view of an embodiment of a coaxial cable compression tool compressing a coaxial cable connector and retaining a coaxial cable, in accordance with the present invention.

With continued reference to FIGS. 1-4, the drawings are further referenced in relation to FIG. 5, which depicts a partial front perspective view of an embodiment of a coaxial cable compression tool 100 compressing a coaxial cable connector 200 and retaining a coaxial cable 300, in accordance with the present invention. The embodiment of the compression tool 100, as depicted in FIG. 5, includes a driving pin 70 located in a full forward position partially advanced into the chamber 80 of the compression tool 100. The driving pin may be attached to the connector 200 to help drive the connector toward the connector cradle portion 50 located across the chamber portion 80. Accordingly, the connector 200 may be inserted into a connector seat 52 (shown in FIG. 4) and compressed onto the cable 300 by compression forces generated by closing the actuator handle 30 and the central body handle 20 together and thrusting the driving pin 70 forward. The retaining apparatus 10 of the compression tool 100 may be employed to releasably retain the coaxial cable 300 in proper alignment for compression mounting the connector 200 onto the coaxial cable 300. Hence, a cable retaining member 12, such as a curved upwardly extending arm or prong, may be flexed outward to allow the coaxial cable to be inserted in the cable retaining portion 14 and held in position until the cable 300 is released by flexing the cable retaining member 12 and allowing the cable 300 to be removed from the cable retaining portion 14.

When retaining a coaxial cable 300, the retaining apparatus 10 bears only minimal, if any, compression forces when the connector 200 is compressed onto the coaxial cable 300 by the connector compression tool 100. Moreover, the retaining mechanism 10 may be attached to the compression tool 100 in a manner so as to prevent transfer of substantial compression force to the retaining mechanism 10. For example, the retaining device 10 may be mounted behind the connector cradle portion 50 so that the cradle portion 50 having connector seat 52, incurs the substantial force generated when the connector 200 is compressed onto the cable 300. Furthermore, the retaining mechanism 10 may be designed to allow the coaxial cable 300 to be slidably retained. In other words, the cable 300 may remain in a proper axial alignment with the connector 200 and/or driving pin 70 while still being free to slide or translate axially toward or away from the connector 200 and or driving pin 70.

Referring further to FIG. 5, embodiments of a connector compression tool 100 may include a connector cradle portion 60, that may be maneuvered into operable position with respect to the chamber 80 and driving pin 70 of the compression tool. The connector cradle portion 60 may include a connector seat 62. In addition, the connector cradle portion 60 may be moved via actuation of switch member 90. Those in the art should appreciate that embodiments of a connector compression tool 100 may not include multiple cradle portions, but may be configured with a single cradle portion facilitating compression of connectors 200 of a corresponding length. Moreover, a single cradle portion, such as cradle portion 50, may be configured with multiple connector seats, such as seat 52, that may be located at various axial depths within the cradle portion 50 and may have various widths thereby accommodating compression of multiple connectors of various sizes. Accordingly, resilient embodiments of the retaining mechanism 10 may be able to accommodate cables and/or connectors of various widths by capitalizing on the flexible nature of the retaining mechanism 10.

Figure 6:
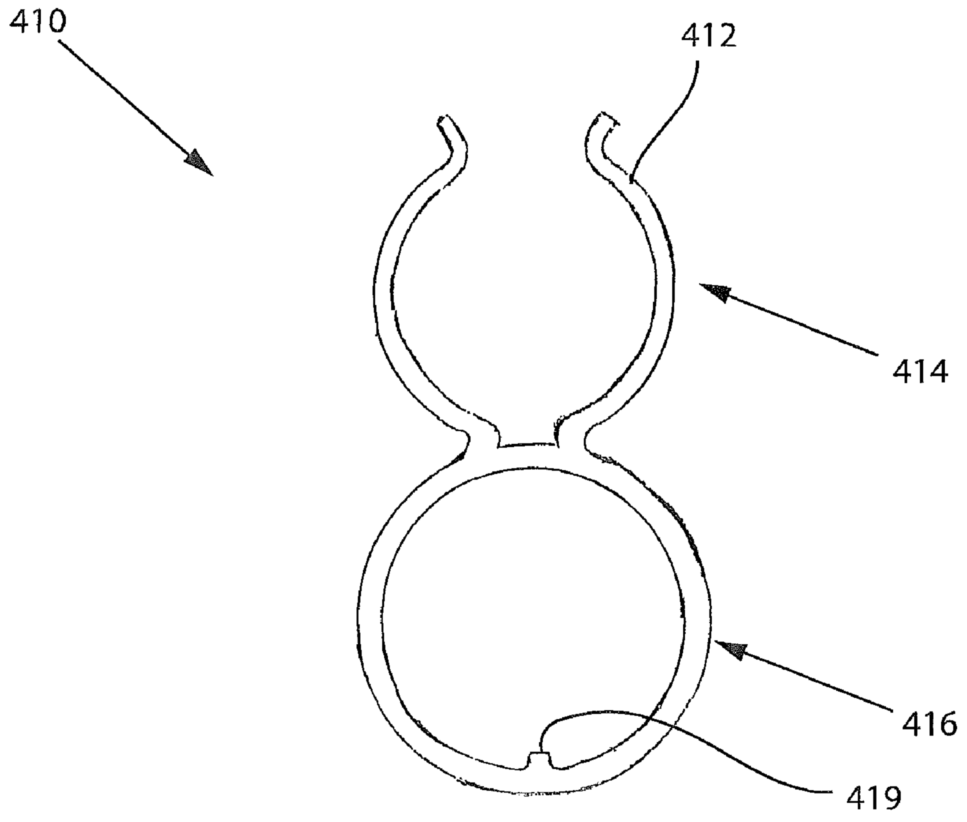
FIG. 6 depicts a front view of another embodiment of a retaining mechanism of an embodiment of a coaxial cable compression tool, in accordance with the present invention.

With continued reference to the drawings, FIG. 6 depicts a front view of another embodiment of a retaining mechanism 410 of an embodiment of a coaxial cable compression tool, in accordance with the present invention. The retaining mechanism 410 may be configured to be removable from a coaxial cable compression tool, such as compression tool 100. For instance, a tool mounting portion 416 may comprise a generally circular shape having an opening so that the retaining mechanism 410 may be bent open farther and snapped onto a portion of a compression tool. Hence embodiments of a retaining apparatus 410 may be resilient allowing the retaining device 410 to flex. Those in the art should appreciate that the tool mounting portion 416 need not be an open structure, but may be have an enclosed surfaced that may be slipped over and secured to a corresponding component of a compression tool. When mounted on a compression tool the mounting portion 416 may conform to the geometry of the compression tool to help hold the retaining apparatus 410 in place on the tool. Furthermore, the retaining apparatus 410 may also include a key member 419. The key member 419 may operate with a corresponding feature of a compression tool (such as compression tool 100 in FIG. 5) to help keep the retaining apparatus oriented accurately in order to facilitate proper alignment of a coaxial cable (such as cable 300 in FIG. 5) when a connector (such as connector 300 in FIG. 5) is compressed onto the cable 300 by the compression tool 100. Additionally, the retaining mechanism 410 may include a cable receiving portion 414 designed to releasably retain an inserted coaxial cable. Accordingly, the receiving portion 414 may include a retaining member 412, which may provide compliant pressure to an inserted cable, thereby keeping the cable from easily escaping the receiving portion 414.

Figure 7:
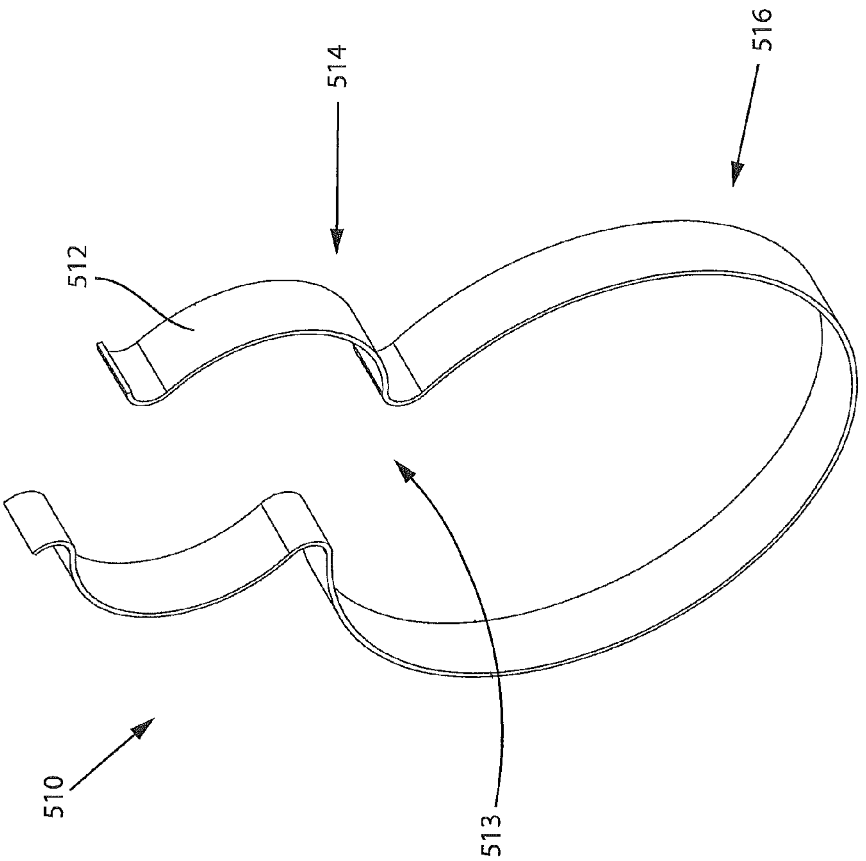
FIG. 7 depicts a perspective view of a further embodiment of a retaining mechanism of an embodiment of a coaxial cable compression tool, in accordance with the present invention.

Referring further to the drawings, FIG. 7 depicts a perspective view of a further embodiment of a retaining mechanism 510 of an embodiment of a coaxial cable compression tool, such as tool 100, in accordance with the present invention. The retaining mechanism 510 may comprise a compliant structure having various features including, inter alia, a flexible cable receiving portion 514 formed by two cable retaining member elements 512 fashioned to operate as a resilient dual arcuate feature that may be bent open to receive a coaxial cable, such as cable 300. The cable receiving portion 514 may be configured to releasably retain a coaxial cable. For example, the arms, or cable retaining elements 512, may be bent outward to allow releasable insertion of a coaxial cable 300 therein. Moreover, embodiments of a retaining mechanism 510 may comprise a tool mounting portion 116 being sized to attach to a connector compression tool 100. The tool mounting portion may be a flexible arcuate structure having a small open segment 513 with cable retaining elements protruding in reverse arcuate fashion therefrom. The tool mounting portion 516 may be attached to an embodiment of a compression tool 100 in a manner so as to prevent transfer of substantial compression force to the retaining mechanism 510. Accordingly, the retaining mechanism 510 may be configured to bear minimal compression force while operably positioned on a compression tool 100. In further addition, embodiments of the tool mounting portion may be releasably attachable to a compression tool 100. For instance, the arcuate tool mounting portion 516 may be bent open so that a portion of a compression tool 100 may be snapped past the open segment 513 and into the tool mounting portion 516. Accordingly the retaining mechanism 510 may be securely, but releasably attached to the tool 100. Embodiments of a retaining device 510 of a compression tool 100 may hold a coaxial cable 300 in proper alignment when the compression tool 100 is operated to compress a coaxial cable connector, such as connector 200, onto the coaxial cable 300.

Figure 8:
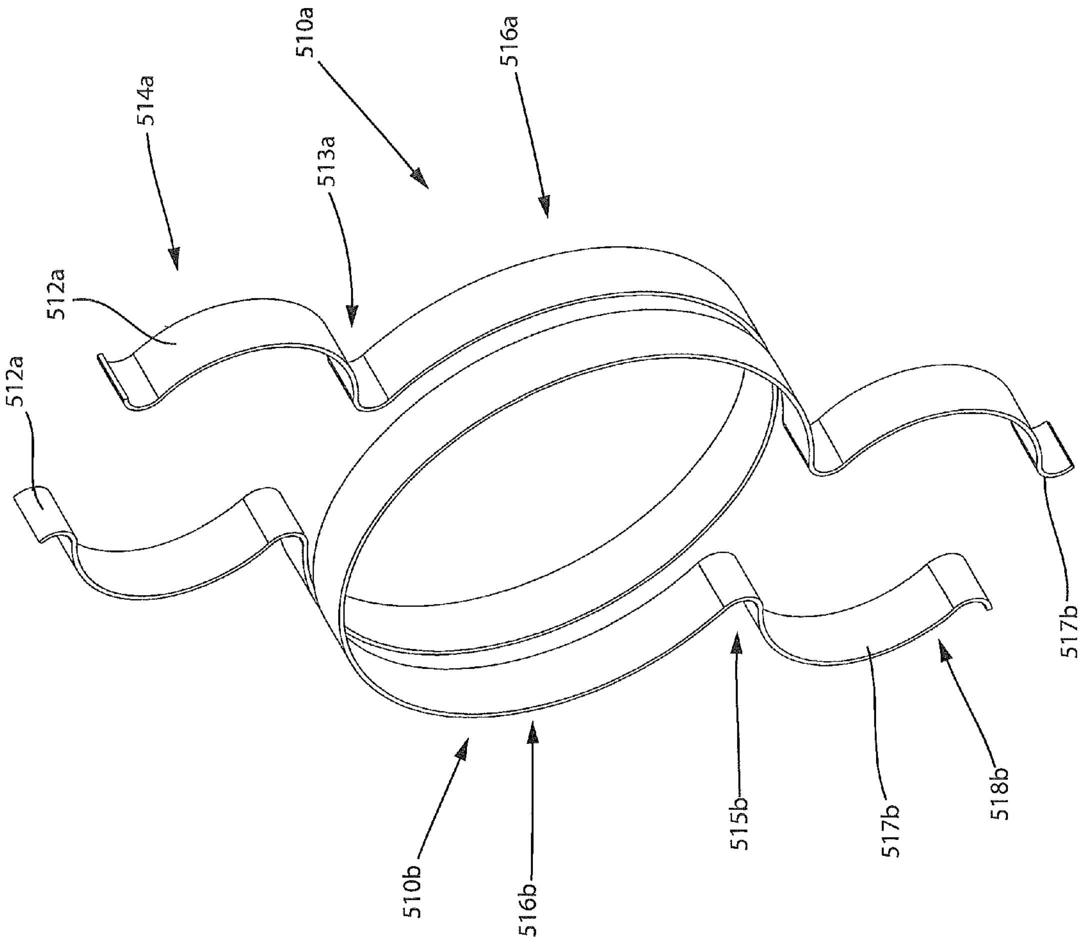
FIG. 8 depicts a perspective view of two embodiments of retaining mechanisms of an embodiment of a coaxial cable compression tool, in accordance with the present invention.

Multiple retaining mechanisms, may be operable with a compression tool 100. With further reference to the drawings, FIG. 8 depicts a perspective view of two embodiments of retaining mechanisms 510*a* and 510*b* of an embodiment of a coaxial cable compression tool, such as compression tool 100, in accordance with the present invention. The elemental features of retaining device 510*a* may be identical or equivalent with those of retaining device 510 discussed in relation to FIG. 7. Retaining device 510*b* may include a tool mounting portion 516*b* that may be similar in structure and functionality the tool mounting portion 516*a* of retaining device 510*a*. However, retaining device 510*b* may include an open segment 515 that may be larger or smaller than the open segment 510*a* of retaining device 510*a*. Like the tool mounting portion 516*a*, the tool mounting portion 516*b* may be attached to an embodiment of a compression tool 100 in a manner so as to prevent transfer of substantial compression force to the retaining mechanism 510*b*. Accordingly, the retaining mechanism 510*b* may be configured to bear minimal compression force while operably positioned on a compression tool 100. Moreover, retaining device 510*b* may also include connector retaining elements 518*b* that may operate with a connector receiving portion 517*b*. The connector receiving portion 517*b* may be fashioned to operate as a resilient dual arcuate feature that may be bent open to receive a coaxial cable, such as cable 300. Moreover, the connector receiving portion 517*b* may be configured to releasably retain a coaxial cable connector. For example, the arms, or connector retaining elements 518*b*, may be bent outward to allow releasable insertion of a coaxial cable connector, such as connector 200, therein. Embodiments of a retaining device 510*b* of a compression tool 100 may hold a coaxial cable connector, such as connector 200 in proper alignment when the compression tool 100 is operated to compress the coaxial connector 200, onto the coaxial cable 300. The multiple retaining mechanisms 510*a* and 510*b* may be operate with a compression tool 100 currently, wherein both retaining mechanisms 510*a* and 510*b* are positioned on the tool 100. However, the retaining mechanisms 510*a* and 510*b* may also operate separately, wherein only one of the mechanisms 510*a* or 510*b* is positioned on the tool 100.

Figure 9:
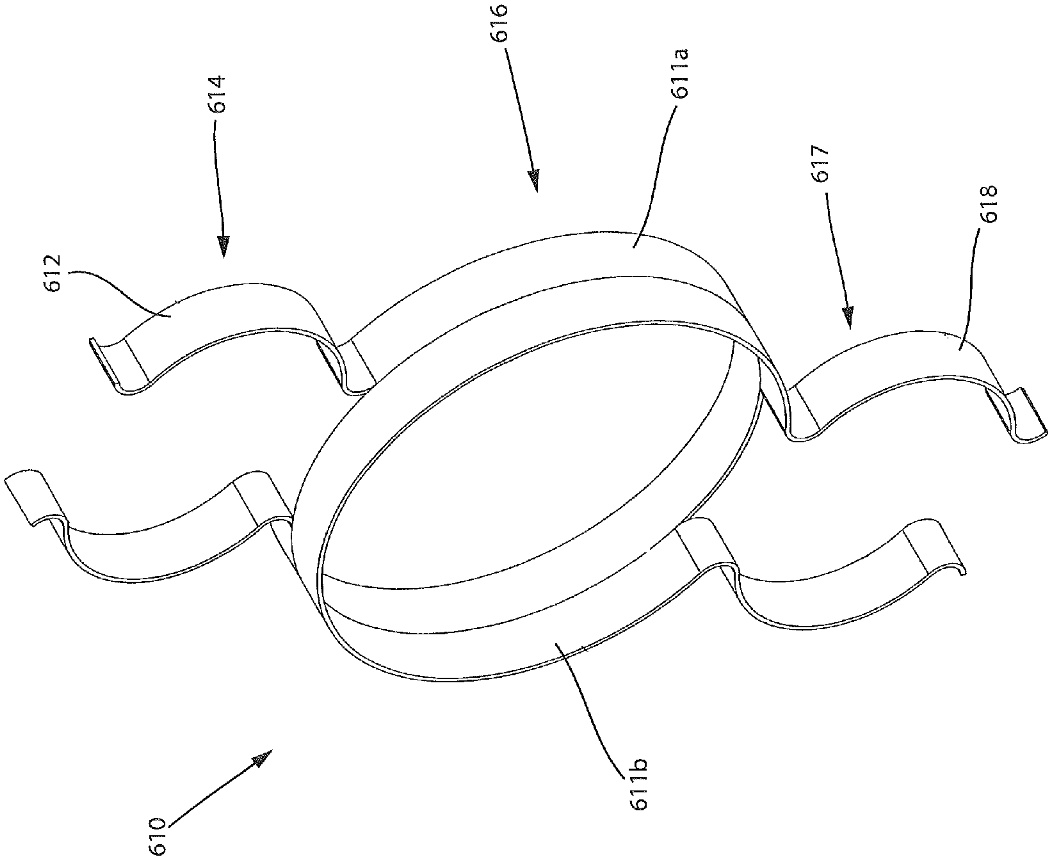
FIG. 9 depicts a perspective view of a still further embodiment of a retaining mechanism of an embodiment of a coaxial cable compression tool, in accordance with the present invention.

In addition, a single retaining mechanism may be formed of separately attached components. For example, FIG. 9 depicts a perspective view of a still further embodiment of a retaining mechanism 610 of an embodiment of a coaxial cable compression tool, such as compression tool 100, in accordance with the present invention. Retaining mechanism 610 may be a conjoined structure securely combining multiple component parts. For instance, a retaining mechanism 610 may be formed by fixedly attaching a retaining mechanism 510*a* to a retaining mechanism 510*b* in an operable manner. A retaining mechanism 610 may comprise a tool mounting portion 616 configured to be mounted on a compression tool 100. Moreover, a retaining mechanism may include a cable receiving portion 614 designed to releasably retain an inserted coaxial cable. Accordingly, the receiving portion 614 may include a retaining member 612, which may provide compliant pressure to an inserted cable, thereby keeping the cable from easily escaping the receiving portion 614. Furthermore, the retaining mechanism 610 may include a connector receiving portion 617 designed to releasably retain an inserted coaxial cable connector. Accordingly, the connector receiving portion 617 may include a retaining member 618, which may provide compliant pressure to an inserted connector, thereby keeping the connector from easily escaping the connector receiving portion 617. The multiple component parts of a retaining mechanism 610 may be affixed together by various means. For example, a part 611*a* may be spot welded to a portion 611*b* at a location(s) proximate the tool mounting portion 616. Additionally, multiple component portions may be joined by adhesives, connected via tapes or coatings, melted together, molded together via plasticizers, and or any other like method or means that may operably connect multiple component parts of a retaining mechanism 610 together.

Figure 10:
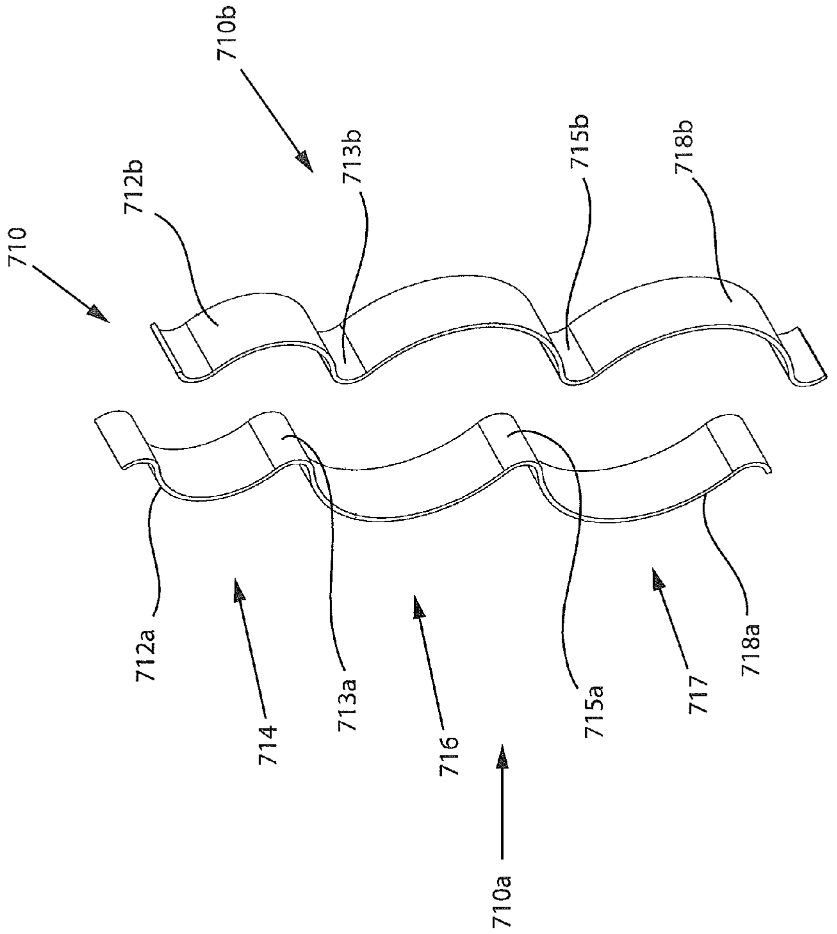
FIG. 10 depicts a perspective view of separate component elements of an embodiment of a retaining mechanism operable with an embodiment of a coaxial cable compression tool, in accordance with the present invention; and, FIG. 11 depicts a partial front perspective view of an embodiment of a coaxial cable compression tool compressing a coaxial cable connector and retaining said coaxial cable connector, in accordance with the present invention.

With continued reference to the drawings, FIG. 10 depicts a perspective view of separate component elements 710*a* and 710*b* of an embodiment of a retaining mechanism 710 operable with an embodiment of a coaxial cable compression tool, such as tool 100, in accordance with the present invention. The component part 710*a* of retaining device 710 may include a cable retaining member 712*a* and a connector retaining member 718*a*. The component part 710*b* of retaining device 710 may include a cable retaining member 712*b* and a connector retaining member 718*b*. The two component parts 710*a-b* may be attached or combined to form a conjoined structure comprising retaining mechanism 710. As such, the two component parts 710*a-b* of a retaining mechanism 710 may be affixed together by various means. For example, a cable segment portion 713*a* of part 710*a* may be spot welded to a cable segment portion 713*b* of part 710*b*. Additionally, a connector segment portion 715*a* of part 710*a* may be spot welded to a connector segment portion 715*b* of part 710*b*. However, those in the art should recognize that the two component parts may be connected together by adhesives, fastened by tapes or coatings, melted together, molded together via plasticizers, and or any other like method or means that may operably connect multiple component parts of a retaining mechanism 610 together. When connected as a whole unit the retaining mechanism 710 may include a cable receiving portion 714, a connector receiving portion 717 and a tool mounting portion 716, all operable in manners similar to those of the various other embodiments of a retaining mechanism(s) of a compression tool 100.

Figure 11:
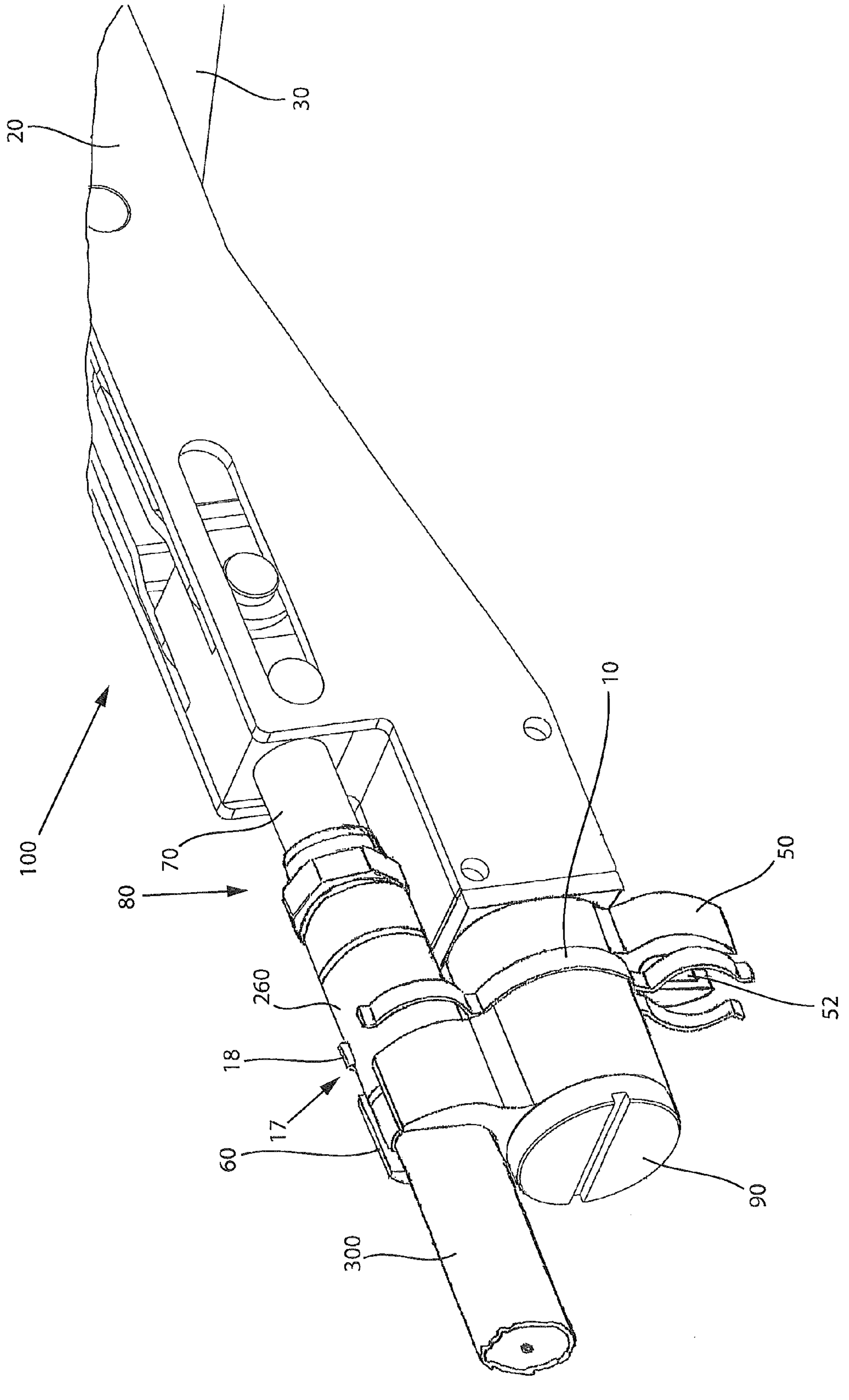

Referring further to FIGS. 1-10 and with additional reference to FIG. 11, a coaxial cable connector compression tool 100 is depicted, wherein a connector cradle portion 60 is positioned proximate a chamber portion 80 while a connector cradle portion 50 is positioned away from the chamber portion 80. Accordingly, as depicted, a longer connector 260, may be seated in the connector cradle portion 60, allowing the compression tool 100 to compress connectors of various sizes (see connector 200 shown in FIG. 5 as compared with connector 260 shown in FIG. 11). A switch member 90 may be affixed to the cradle portions 50 and 60 so that when the switch member 90 is rotated the cradle portions 50 and 60 also rotate. Hence a user may actuate the switch member 90 to switch from one cradle portion 50 to another cradle portion 60 that may be in operable position for compression a corresponding connector 200 or 260. Moreover, the switch member 90 may be configured to rotate the retaining mechanism 10 so that the connector retaining member 18 is located on said tool 100 in a manner facilitating proper alignment of said connector 260 during operation of said coaxial cable connector compression tool 100. A retaining mechanism 10 may move in relation to the rotation of the cradle portions 50 and 60. For example, as depicted, the connector retaining member 18 of the retaining device 10 releasably retains a connector 260 in proper alignment for compression onto a coaxial cable 300. The retaining member 18 may be part of a retaining portion 17. The configuration, placement and operation of the retaining mechanism 10 should be such that minimal, if any, compression forces are applied to the retaining portion 17 of the retaining mechanism 17. Thus, although the retaining portion and included retaining member 18 serve to hold the connector 260 in proper alignment for compression, the connector 260 may still be free to slidably, axially translate in relation to the connector retaining portion 17 and the chamber 80 of the compression tool 100. Those in the art should appreciate that an embodiment of a retaining device 410 or retaining device 11 may also be utilized with an embodiment of a connector compression tool 100 having the connector cradle 60 switched into operable position. Embodiments of the retaining mechanism, such as device 410, device 510, device 610, or device 710, may move during cradle re-alignment and/or may be removed during switching of the cradle portions 50 and 60 and merely reattached when the switch has occurred.

Embodiments of a coaxial cable connector compression tool 100 may comprise a connector seat 52, wherein the connector seat 52 may bear compression forces related to the compression of a coaxial cable connector 200 onto a coaxial cable 300 by the compression tool 100. In addition embodiments of a coaxial cable connector compression tool 100 may also comprise means for retaining a coaxial cable 300 in proper alignment during compression of a coaxial cable connector 200 onto the coaxial cable 300, wherein the means are configured to bear minimal compression forces during tool 100 compression. Accordingly, such means may include a compliant retaining mechanism 10 having a cable retaining portion 14 and being mounted to the compression tool 100 in a position and in a manner that avoids the incursion of compression forces when the tool 100 is operated to compress a connector 200 onto a cable 300. Still further, embodiments of a coaxial cable connector compression tool 100 may also comprise means for retaining the coaxial cable connector 200 in proper alignment during compression of the coaxial cable connector 200 onto the coaxial cable 300, wherein the means are configured to bear minimal compression forces during tool compression. As such, the connector retaining means may include a compliant retaining mechanism 10 having a connector retaining portion 17 and being mounted to the compression tool 100 in a position and in a manner that avoids the incursion of compression forces when the tool 100 is operated to compress a connector 200 onto a cable 300.

With continued reference to the drawings, a method of compressing a coaxial cable connector 200 onto a coaxial cable 300 is described in reference to FIGS. 1-10. One method step may include providing a compression tool 100. The provided compression tool may include a retaining mechanism 10. The retaining mechanism may be configured as a single, unbroken, piece of resilient material. However, the retaining mechanism may be similar in embodiment to retaining mechanisms 610 or 710 formed of separately attached component elements. In addition, the retaining mechanism 10 may have a tool mounting portion 16 affixed to the compression tool 100. Moreover, the retaining mechanism 10 may have a compliant cable receiving portion 14, configured to releasably retain the coaxial cable 300. An additional method step may include inserting the coaxial cable 300 into the compliant cable receiving portion 14. Furthermore, another method step may include inserting the coaxial cable connector 200 into a connector seat 52 of the compression tool 100. Still further, another method step may include compressing the compression tool 100 to compress the coaxial cable connector 200 onto the coaxial cable 300. During compression of the tool 100 the retaining mechanism 10 may hold the coaxial cable 300 in proper alignment, for accurate fixation of the connector 200 onto the cable 300, without bearing substantial compression forces when the compression tool 100 is operated to compress the coaxial cable connector 200 onto the cable 300.

Referring still further to FIGS. 1-10 and with additional reference to FIG. 11, additional methodology for compressing a coaxial cable connector 260 onto a coaxial cable 300 is described. The compression tool may be switched for compression of the connector 260. For example, the switch member 90 may be rotatably actuated to maneuver the connector cradle 60 up into operable proximity with the drive pin 70 and compression chamber 80 of the tool 100. Additionally, the connector 260 may be inserted into the connector retaining portion 17 of the retaining mechanism 10. Moreover, the connector 260 may also be seated into the connector seat 62 of the connector cradle 60. Furthermore, a user may operate the compression tool 100 to compress the coaxial cable connector 260 onto the coaxial cable 300. During compression of the tool 100 the retaining mechanism 10 may hold the connector 260 in proper alignment, for accurate fixation of the connector 260 onto the cable 300, without bearing substantial compression forces when the compression tool 100 is operated to compress the coaxial cable connector 260 onto the cable 300. Those in the art should appreciate that similar methodology for retaining a coaxial cable 300 or connector 260 in proper alignment during compression of a coaxial cable connector 220 or 260 onto the coaxial cable 300 may be involved in relation to the operation of various retaining mechanism embodiments, such as retaining devices 410, 510, 610 or 710, and in regard to general operation of a compression tool 100.

Various modifications and variations of the described apparatus and methods of the invention will be apparent to those skilled in the art without departing from the scope and spirit of the invention. Although the invention has been described in connection with specific embodiments, outlined above, it should be understood that the invention should not be unduly limited to such specific embodiments. Various changes may be made without departing from the spirit and scope of the invention as defined in the following claims.

What is claimed is:

1. A coaxial cable connector compression tool comprising:

a connector seat, wherein said connector seat bears compression forces related to the compression of a coaxial cable connector onto a coaxial cable by said compression tool; and a resilient retaining mechanism including a flexible coaxial cable receiving portion, the flexible coaxial cable receiving portion being configured to releasably retain a coaxial cable, wherein said flexible coaxial cable receiving portion of said retaining mechanism includes a cable retaining member being flexible substantially throughout its dimension, so that the entire portion of the cable retaining member is operable to flex and bend outward and allow releasable insertion of the coaxial cable into the flexible coaxial cable receiving portion of the resilient retaining mechanism; and further wherein said retaining mechanism is attached to said compression tool in a manner so as to prevent transfer of substantial compression force to any portion of said resilient retaining mechanism.

2. The coaxial cable connector compression tool of claim 1, further comprising a flexible connector receiving portion, the flexible connector receiving portion being configured to releasably retain a coaxial cable connector, wherein said flexible connector receiving portion includes a connector receiving member.

3. The coaxial cable connector compression tool of claim 1, wherein said cable retaining member of said flexible coaxial cable receiving portion is positioned and configured to releasably retain said coaxial cable in proper alignment during operation of said coaxial cable connector compression tool.

4. The coaxial cable connector compression tool of claim 2, wherein said connector retaining member is operable to flex and bend outward and allow releasable insertion of the connector into the flexible connector receiving portion of the resilient retaining mechanism and releasably retain said connector.

5. A compression tool mounted coaxial cable retaining apparatus comprising:

a compliant structure, said structure being separate from a compression force-bearing cradle portion of a compression tool, wherein said structure includes:

a tool mounting portion, affixed to said compression tool; and a flexible coaxial cable receiving portion, the flexible coaxial cable receiving portion being configured to releasably retain a coaxial cable, wherein said flexible coaxial cable receiving portion of said compliant structure includes a cable retaining member being operable throughout its entirety to flex and bend outward and allow releasable insertion of the coaxial cable into the flexible coaxial cable receiving portion of the compliant structure; and, wherein said compliant structure bears minimal compression forces while positioned on said compression tool to hold said coaxial cable in proper alignment when said compression tool is operated to compress a coaxial cable connector onto said cable.

6. The compression tool mounted coaxial cable retaining apparatus of claim 5, wherein said compliant structure further comprises a flexible connector receiving portion, the flexible connector receiving portion being configured to releasably retain a coaxial cable connector, wherein said flexible connector receiving portion includes a connector receiving member, the connector retaining member being operable to flex and bend outward and allow releasable insertion of the connector into the flexible connector receiving portion of the compliant structure.

7. The compression tool mounted coaxial cable retaining apparatus of claim 5, wherein said compliant structure is mounted behind a connector cradle portion of said tool so that a connector seat of said cradle portion incurs substantial force generated when said connector is compressed onto said cable.

8. The compression tool mounted coaxial cable retaining apparatus claim 5, wherein the cable receiving portion includes two cable retaining members defined as flexible arms extending from said tool mounting portion.

9. A compression tool comprising:

a connector seat, wherein said connector seat bears compression forces related to the compression of a coaxial cable connector onto a coaxial cable by said compression tool; and means for retaining said coaxial cable in proper alignment during compression of said coaxial cable connector onto said coaxial cable, wherein said means are entirely flexible and are configured to bear minimal compression forces during tool compression.

10. The compression tool of claim 9, further comprising means for retaining said coaxial cable connector in proper alignment during compression of said coaxial cable connector onto said coaxial cable, wherein said means are configured to bear minimal compression forces during tool compression.

* * * * *